United States Patent
Linden et al.

(10) Patent No.: US 6,422,122 B1
(45) Date of Patent: Jul. 23, 2002

(54) ELECTRONICALLY CONTROLLABLE BRAKE BOOSTER

(75) Inventors: Christoph Linden, Vallendar; Lothar Zeuner, Steineroth, both of (DE)

(73) Assignee: Lucas Industries Public Limited Company (GB)

(*) Notice: Subject to any disclaimer, the term of this patent is extended or adjusted under 35 U.S.C. 154(b) by 0 days.

(21) Appl. No.: 09/539,844

(22) Filed: Mar. 31, 2000

Related U.S. Application Data

(63) Continuation of application No. PCT/EP98/06221, filed on Sep. 30, 1998.

(30) Foreign Application Priority Data

Oct. 6, 1997 (DE) .......................................... 197 44 052

(51) Int. Cl.[7] .............................................. F15B 13/16
(52) U.S. Cl. ...................... 91/367; 137/102; 137/516.17
(58) Field of Search .............................. 91/367, 376 R; 137/102, 516.17

(56) References Cited

U.S. PATENT DOCUMENTS

| | | | | |
|---|---|---|---|---|
| 4,671,167 A | * | 6/1987 | Endo et al. ................ | 91/367 R |
| 5,176,063 A | * | 1/1993 | Levrai et al. .............. | 91/376 R |
| 5,460,074 A | * | 10/1995 | Baltz et al. ................ | 91/376 R |
| 5,845,556 A | * | 12/1998 | Tsubouchi et al. ........ | 91/376 R |
| 5,969,443 A | | 10/1999 | Linden et al. | |
| 6,155,156 A | * | 12/2000 | Takasaki et al. .......... | 91/376 R |

FOREIGN PATENT DOCUMENTS

| | | |
|---|---|---|
| DE | 195 27 493 A1 | 1/1997 |
| DE | 196 12 952 A1 | 10/1997 |
| DE | 197 07 960 A1 | 9/1998 |

\* cited by examiner

*Primary Examiner*—F. Daniel Lopez
*Assistant Examiner*—Igor Kershteyn
(74) *Attorney, Agent, or Firm*—MacMillan, Sobanski & Todd, LLC

(57) ABSTRACT

The invention utilizes the finding that a pressure variation or pressure difference between two chambers of a brake booster is a parameter of considerable influence on the behavior of a brake booster control valve arrangement in the operation of the brake booster. Starting from a holding position for the control valve arrangement, pressure levels related to changeovers from the holding position to a first pressure changing position and a second pressure changing position, respectively, are determined. Depending on the thus determined pressure level differences, current values for an actuation of the control valve arrangement defining upper and lower limits for the holding position are adjusted.

12 Claims, 3 Drawing Sheets

ELECTRONICALLY CONTROLLABLE BRAKE BOOSTER

CROSS REFERENCE TO RELATED APPLICATIONS

This application is a continuation of International Application No. PCT/EP98/06221 filed Sep. 30, 1998, which claims priority to German Patent Application No. 19744052.5 filed Oct. 6, 1997.

BACKGROUND OF THE INVENTION

The present invention relates to an electronically controllable brake booster. In particular, the present invention relates to an electronically controllable brake booster with a vacuum chamber and a pressure chamber, which are separated from each other by a movable wall, a control valve arrangement which can be actuated by means of an electromagnetic actuation means, and by means of which a pressure difference between the pressure chamber and the vacuum chamber can be adjusted, with the control valve arrangement, as a function of a current flowing through the electromagnetic actuation means, assuming a holding position in which the current ranges between a higher value and a lower value without the control valve arrangement leaving its holding position, a first pressure changing position in which the current is higher than the higher value, and a second pressure changing position in which the current is lower than the low value.

From DE 195 27 493 A1 an electromagnetic actuation means is known which comprises a solenoid coil which can be subjected to a control current and an armature which is associated with the solenoid coil and which is adapted to perform movements which are a function of a control current flowing through the solenoid coil and a spring arrangement which biases the armature in the opposite direction.

Therein, a holding position is defined as a manipulated variable, which the armature assumes at a holding current through the solenoid coil. This holding current flowing through the solenoid coil can be changed to a higher value or to a lower value without the armature leaving the holding position.

In addition, both the higher and the lower current value are dimensioned in such a manner that interfering influences on the magnetic and spring forces actuating the armature do not bring the armature into an actuated position which differs from the holding position.

For this purpose, the higher current value is determined in such a manner that a value which is related to the position of the armature in the holding position is determined; the control current is increased by a predetermined current step in a stepwise manner and output as a manipulated variable to the solenoid coil of the electromagnetic actuation means, until the value which is related to the position of the armature in the holding position changes by a predetermined value towards the second actuated position.

The lower current value is determined in such a manner that a value which is related to the position of the armature in the holding position is determined; the control current is decreased by a predetermined current step in a stepwise manner, and output as a manipulated variable to the solenoid coil of the electromagnetic actuation means, until the value which is related to the position of the armature in the holding position changes by a predetermined value towards the first actuated position.

From this document is it also known that the control valve arrangement can reliably be brought into the holding position if the arithmetic mean value of the currents is selected for the holding current.

However, the "Learning of the working points" covered in DE 195 27 493 A1 is limited in that the decisive currents for the lower limit and the upper limit must be learned and stored at each commencement of a trip upon switching on the ignition or in periodic time intervals during driving. Upon controlling the control valve arrangement, the currents which have been learned in this manner are used for specifying the first manipulated variable in order to achieve an adequate control behavior.

However, the pressure difference acting upon the movable wall of the brake booster, which can be adjusted to different values depending upon the desired control, is not considered quantitatively.

The pressure difference adjusted at the movable wall is also acting immediately upon the valve body, the valve seat, and the valve element, which also leads to a shift of the currents for the lower limit and for the upper limit.

SUMMARY OF THE INVENTION

The invention deals with the problem which results from the shift of the upper and lower current values that are necessary in order to retain the control valve arrangement in its holding position.

It is the object of the present invention to eliminate this disadvantage so that the control behavior is further improved.

The invention thereby utilises, in particular, the finding that the pressure variation or the pressure difference, respectively, between the two chambers is a parameter of considerable influence on the behavior of the control valve arrangement in the operation of the brake booster. The behavior of the control valve arrangement, however, is also influenced by the actual area of the movable wall, because the force acting on the control valve arrangement is the product of the pressure difference at the movable wall and the area of the movable wall. Due to the fact that the area of the movable wall is subject to production-related variations and is also series-dependent, it is not possible, in particular for a fast control, to work with absolutely accurate approximate values.

As a solution, the invention proposes that a value be sensed in the pressure chamber at two different pressure levels, which is characteristic for the pressure difference between the vacuum chamber and the pressure chamber, with the control valve arrangement in each case being in the holding position and, starting from the holding position, the current through the electromagnetic actuation means in each case being modified in such a manner that the control valve arrangement obtains the first pressure changing position or the second pressure changing position, respectively, and with the current values for the changeover from the holding position into the first pressure changing position at a high pressure level, for the changeover from the holding position into the first pressure changing position at a low pressure level, and/or for the changeover from the holding position into the second pressure changing position at a high pressure level, and for the changeover from the holding position into the second pressure changing position at a low pressure level being evaluated in order to determine a characteristic for the operation of the brake booster, according to which the current values for the upper and lower limit of the holding position of the control valve arrangement at different pressure levels are adjusted.

In a further development of the invention, the determination of the current for the upper and lower limit for the holding position of the control valve arrangement can also be effected for more than two pressure levels. In this case, not only a linear interpolation is performed between the determined points. Rather, depending on the number of interpolation points, even more accurate adjustments of the current values between the minimum and the maximum pressure level can be made.

These additional interpolation points in the pressure level characteristic can be desirable because significant non-linearities can occur due to interfering influences, such as e.g. friction losses in the movement of the armature and the valve components coupled with same, tolerances of the first and second spring arrangement, temperature variations, or variations of external reaction forces which, in particular, include variations of the pressure force component in the vacuum chamber.

In a preferred embodiment, an axial displacement of the movable wall is effected by the pressure difference between the pressure chamber and the vacuum chamber, which drives a housing of the control valve arrangement.

In this specific configuration, the electromagnetic actuation means is arranged in the housing, which comprises a solenoid and an armature, with the armature being movable relative to the housing in the axial direction under the assistance of a first spring arrangement.

In the housing interior, a valve arrangement is formed which connects or separates the vacuum chamber and the pressure chamber, with a valve body of the valve arrangement being biased by a second spring arrangement towards a valve seat or a valve element, respectively, of the valve arrangement.

In a preferred embodiment of the invention, the hydraulic or pneumatic pressure generated in a master cylinder downstream of the brake booster is evaluated as the characteristic parameter for the pressure difference.

According to a particularly preferred embodiment, the first pressure changing position is a pressure build-up position and the second pressure changing position is a pressure relief position.

The following description in which reference is made to the accompanying drawings, serves to further explain characteristics, variation possibilities, and properties of the invention.

DETAILED DESCRIPTION OF THE INVENTION

Figure 1:
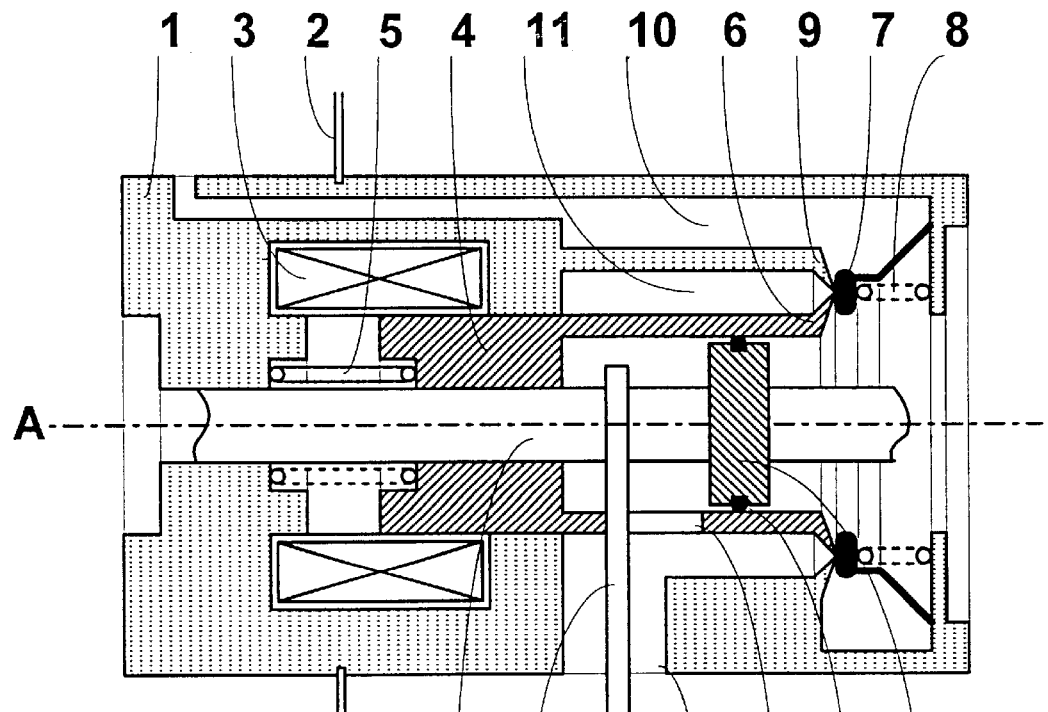
FIG. 1 shows a section through a schematically illustrated control valve arrangement of an electronically controlled brake booster in a non-actuated condition.
Figure 2:
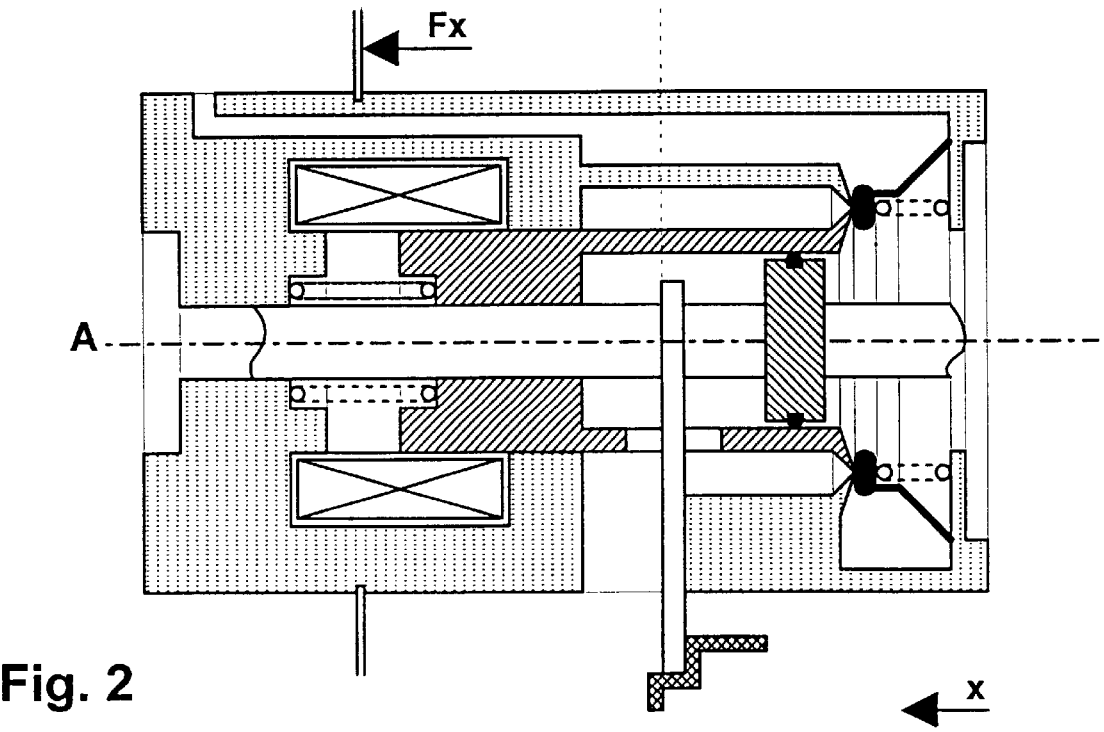
FIG. 2 shows a section through the schematically illustrated control valve arrangement of an electronically controlled brake booster according to FIG. 1 in an actuated condition.

The control valve arrangement which is schematically shown in FIGS. 1 and 2 of an electronically controlled brake booster is essentially rotation symmetrical with respect to an axis A and comprises a housing 1 which is securely connected with a movable wall 2. The movable wall 2 divides the brake booster (not shown) into two chambers, with a vacuum chamber (not shown) being situated at the left side of the movable wall 2 and a pressure chamber (not shown) being situated at the right side of the movable wall 2. A force Fx at the movable wall 2, which is generated by a pressure difference between the pressure chamber and the vacuum chamber causes a displacement of the movable wall in the x direction, with the housing 1 being driven by same.

An electromagnetic actuation means is arranged in the housing 1 and comprises a solenoid 3 and an armature 4 which is movable relative to the housing 1 in the x direction with the assistance of a first spring 5. In the interior of the housing 1 a stationary annular valve seat 9 is formed which separates a duct 10 entering the vacuum chamber (not shown) at the left side of the movable wall 2 from an annular space 11 defined by the armature 4, which via a recess 13 in the housing 1 communicates with the pressure chamber (not shown) arranged at the right side of the movable wall 2. At the right end of the armature 4 a concentric valve element 6 is formed. The valve seat 9 and the valve element 6 cooperate with an annular valve body 7. The valve body 7 is biased towards the valve seat 9 or the valve element 6, respectively, by a second spring 8.

A piston 17 and a piston rod 12 connected with same are guided centrally to the armature 4. The piston 17 is in connection with an actuation rod (not shown) which in the known manner serves to mechanically actuate the brake booster (not shown). The piston 17 is sealed against the armature 4 or the valve element 6, respectively, in the radial direction via an annular sealing element 18. At the right of the sealing element 18, an atmospheric pressure is permanently prevailing.

The armature 4 or the sealing element 6, respectively, comprises a recess 15 which is followed by the recess 13 in the housing 1. A stop member 14 is securely connected with the piston 17 or the piston rod 12, respectively, for a common axial movement and extends radially through the recesses 15 and 13 to the outside. With the mechanically non-actuated brake booster, the piston 17 or the piston rod 12, respectively, assumes the rest position shown in FIGS. 1 and 2, in which the stop member 14 abuts a stop 16 which is independent of the position of the housing 1.

The armature 4 or the valve element 6, respectively, is urged to the right by a first spring 5 which bears against the housing 1. With the non-actuated electromagnetic means according to FIG. 1 the armature 4 or the valve element 6, respectively, bears against the stop member 14 via the recess 15. Thereby, of the armature 4 assumes a certain position in the x direction, in which the valve element 6 contacts the valve body 7 in such a manner that the duct 10 entering the vacuum chamber, the space 11 being connected with the pressure chamber, and the atmosphere at the right side of the sealing element 18 each are blocked against each other.

Upon current application of the solenoid 3, a magnetic force F3 is exerted on the armature 4, which is directed to the left and thus counteracts the spring force F5 by the first spring 5. This moves the valve element 6 away from the valve body 7, and a connection is generated via the space 11 from the pressure chamber to atmosphere, with the connection to the duct 10 associated with the vacuum chamber being blocked. Because the vacuum chamber is connected with a vacuum source (not shown), a pressure difference is generated at the movable wall 2, which causes a force Fx in the x direction under which the housing 1 is also moved in the x direction. This causes the recess 15 in the armature 4 or the valve element 6, respectively, to be moved relative to the stop member 14 in the x direction to the left so that the armature 4 or the valve element 6, respectively, is not supported by the stop member 14.

In the actuation condition shown in FIG. 2, the current supply to the solenoid 3 is adjusted to such a value that the armature 4 assumes a certain position in which the valve element 6 as in the non-actuated condition shown in FIG. 1 contacts the valve body 7 so that the duct 10, the space 11, and the atmosphere each are blocked against each other. This maintains a pressure difference applied at the movable wall 2, so that the housing 1 is displaced by the travel dx from the rest position according to FIG. 1. This is the so-called "holding position".

If, starting from this "holding position", the current supply to the solenoid 3 is reduced, then the armature 4 and the valve element 6 are moved to the right in the x direction under the action of the spring force F5 exerted by the first spring 5, with the valve body 7 being lifted off the stationary valve seat 9 against the action of the force F8 applied by the second spring 8. This is achieved by designing the second spring arrangement 8 weaker than the first spring arrangement 5. A connection between the duct 10 and the space 11 is thereby created, with the atmosphere being blocked against this connection. This leads to a pressure compensation process between the pressure chamber and the vacuum chamber, so that the pressure difference at the movable wall 2 is relieved. Consequently, this is a so-called "relief position".

A so-called "build-up position" starting from the "holding position" is adjusted in that the current supply to the solenoid 3 is increased, so that the armature 4 and the valve element 6 are moved against the action of the first spring 5 in the x direction to the left, with the valve element 6 being lifted off the valve body 7. Thereby a connection from the atmosphere to the space 11 is created, with the space 10 being blocked against this connection, which, as already explained, results in an increase of the pressure difference applied at the movable wall 2.

The magnetic force F3 acting on the armature 4 is a function of the current flowing through the solenoid 3. By varying the current flowing through the solenoid 3, the position of the armature 4 in the x direction can be adjusted, so that by a controlled changeover with respect to the timing between holding, relief, and build-up position, any desired pressure characteristic can be set. The current supply of the solenoid 3 can be effected by means of current, voltage, or pulse width modulation signals via an electronic control unit (not shown).

Figure 3:
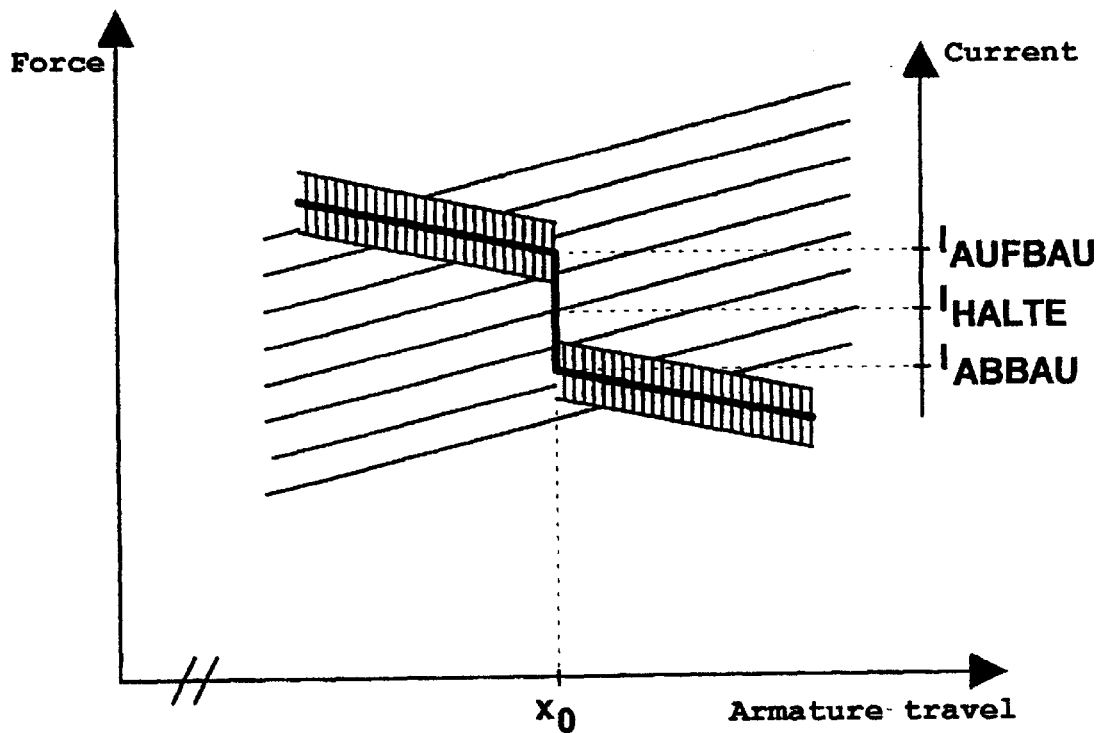
FIG. 3 shows an idealised diagram for explaining the control characteristic of the control valve arrangement of the electronically controlled brake booster according to FIG. 1.

In the diagram according to FIG. 3 the travel of the armature 4 in the x direction is plotted over the abscissa, and the force applied to the armature 4, which is a function of the current flowing through the solenoid 3 according to the current curves, is plotted over the ordinate. This is an idealised schematic representation which refers to a working range which is usually designed in such a manner that a proportional relationship exists between force and current. In addition, the control characteristic of the control valve arrangement formed by the valve element 6, the valve body 7, and the valve seat 9 is entered. This control characteristic comprises a total of three branches. For the vertical branch, a current range $I_{ABBAU}$ to $I_{AUFBAU}$ is associated with a certain armature position x0. The position x0 exactly corresponds to the "holding position" in which the valve element 6 and the valve seat 9 are in a sealing contact with the valve body 7. The inclined branch which from the vertical branch extends towards the left applies to a current higher than $I_{AUFBAU}$ and represents the "build-up" position, while the inclined branch extending to the right of the vertical branch applies to a current lower than $I_{ABBAU}$ and characterises the "relief position".

Figure 4:
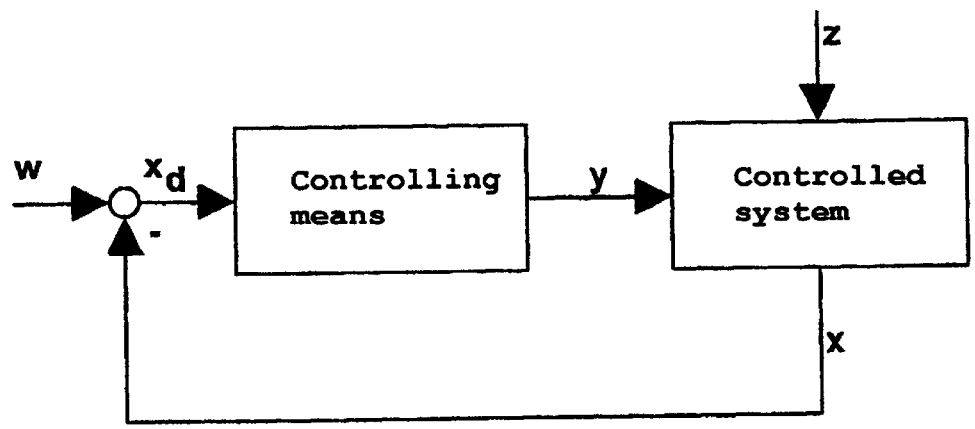
FIG. 4 schematically shows the construction of a simple closed control loop.

Due to interfering influences which are caused, for example, by friction losses upon movement of the armature 4 and the valve components 6, 7 coupled with same, or by tolerances of the first and second spring arrangement 5, 8, or by temperature variations, or variations of external reaction forces which, in particular, include variations of the pressure force component in the vacuum chamber, the control characteristic in the area of the two inclined branches has a scatter band, which leads to a shift of the working points $I_{ABBAU}$ and $I_{AUFBAU}$ The operation of the control valve arrangement takes place in a closed control loop as shown in FIG. 4. A controlled variable x, for example the position of the armature 4 in the x direction, which originates from the controlled system is continuously sensed and compared with a reference variable w. The result of this comparison is a standard deviation xd which is supplied to a controlling means. The manipulated variable y which originates from the controlling means is the current which is supplied to the solenoid 3. The interfering variables z which act upon the controlled system from outside are mainly the previously mentioned influences caused by friction, spring tolerances, and reaction forces. In lieu of the direct position of the armature 4 in the x direction, it is also possible to use a parameter which is related to the position of the armature 4 as the controlled variable x. In the case of the electronic controlled brake booster, this can be, for example, the booster output pressure, and/or the booster output force, and/or the pressure difference generated at the movable wall 2 of the booster, and/or the vehicle speed, and/or the vehicle deceleration.

The inventive method developed for the solution of this object is initially based on the finding that the working point $I_{ABBAU}$ increases with an increasing pressure difference $delta_p$, and that the working point $I_{AUFBAU}$ decreases with an increasing pressure difference $delta_p$. The reason for this is that the pressure difference $delta_p$ exerts a force on the valve body 7, the valve seat 9, and the valve element 6, which counteracts the magnetic force acting on the armature 4 in the "relief position" setting, and which assists the magnetic force acting on the armature 4 in the "build-up position" setting.

There is, of course, the alternative to configure the control valve arrangement also in such a manner that via the pressure difference $delta_p$ a force is exerted on the valve body 7, the valve seat 9, as well as the valve element 6, which assists the magnetic force acting on the armature 4 in the "relief position" setting and counteracts the magnetic force on the armature 4 in the "build-up position" setting. Consequently, the working point $I_{ABBAU}$ would linearly decrease with increasing pressure difference $delta_p$, and the working point $I_{AUFBAU}$ would linearly increase with increasing pressure difference $delta_p$. This means, an exactly reversed, but principally identical behavior would result as it is shown for the control valve arrangement according to FIGS. 1 and 2. For this reason, only the behavior of the control valve arrangement shown in FIGS. 1 and 2 will be explained in more detail in the following.

It was found that, in particular, with ideal conditions as they are given with an (almost) constant pressure force component in the vacuum chamber, there is an (almost) linear relationship between the increase of the working point $I_{ABBAU}$ or the decrease of the working point $I_{AUFBAU}$, respectively, and the increasing pressure difference $delta_p$. The functional dependencies of the currents $I_{ABBAU}$ and $I_{AUFBAU}$ upon the pressure difference $delta_p$ can therefore be described in an ideal approximation as straight line equations (G1, G2), with the straight line equations (G1, G2) each being determined by the gradient parameter $m_{ABBAU}$ or $m_{AUFBAU}$, respectively, as well as by the initial parameter $b_{ABBAU}$ or $b_{AUFBAU}$, respectively.

$$I_{ABBAU} = m_{ABBAU} * delta_p + b_{ABBAU} \quad (G1)$$

$$I_{AUFBBAU} = m_{AUFBAU} * delta_p + b_{AUFBAU} \quad (G2)$$

Sensing of the pressure difference deltas at the movable wall 2 as the controlled variable x is already known from DE 44 26 297 A1. Insofar, when using this measuring method, the currents $I_{ABBAU}$ or $I_{AUFBAU}$, respectively, can be continuously (successively) adjusted to varying pressure differences $delta_p$ via the straight line equations (G1, G2). A prerequisite for this is that the parameters $m_{ABBAU}$, $b_{ABBAU}$, $m_{AUFBAU}$, and $b_{AUFBAU}$ are predetermined, which will later be explained in more detail.

In lieu of the pressure difference $delta_p$ acting on the movable wall 2, however, it is also possible to use the displacement travel of the movable wall 2 in the x direction or the brake pressure $p_{HBZ}$ provided at the booster outlet.

The use of the brake pressure $P_{HBZ}$ provided at the booster outlet is of particular advantage. The generation of the brake pressure $p_{HBZ}$ usually takes place in a master cylinder downstream of the brake booster. Under consideration of the effective pneumatic working area $A_{BKV}$ of the movable wall 2 of the brake booster and the effective hydraulic working area $A_{HBZ}$ of the master cylinder, the brake pressure is calculated as $$p_{HBZ} = (F_{driver} + delta_p * A_{BKV})/A_{HBZ},$$

with $F_{driver}$ being the force component applied by the driver for the mechanical actuation of the brake booster. If the brake booster is actuated only electrically, i.e. if no force component is applied by the driver ($F_{driver}=0$), the brake pressure is calculated as $$p_{HBZ} = delta_p * A_{BKV}/A_{HBZ}.$$

Due to the fact that the working areas $A_{BKV}$ and $A_{HBZ}$ are constant generally unchanging system parameters, the brake pressure $p_{HBZ}$, in this particular case ($F_{driver}=0$) behaves (almost) linear to the pressure difference $delta_p$ acting on the movable wall 2. The parameters $m_{ABBAU}$, $b_{ABBAU}$, $m_{AUFBAU}$, and $b_{AUFBAU}$ of the straight line equations (G1, G2) can therefore be predetermined as follows.

First, the brake pressure $p_{HBZ}$ is adjusted to a high value $p_{HOCH}$ (e.g. 50 bar), whereupon the control valve arrangement has assumed the "holding position". Subsequently, the current $I_{AUFBAU,HOCH}$ is determined which is required for bringing the control valve arrangement into the "build-up position", for which purpose the current is increased stepwise until an increase of the brake pressure can be detected ($p_{HBZ} > p_{HOCH}$). After this, the brake pressure $p_{HBZ}$ is corrected again to the previously set high value $p_{HOCH}$. Now, the determination of the current $I_{AUFBAU, HOCH}$ is made, which is required for bringing the control valve arrangement into the "relief position", for which purpose the current is decreased stepwise until a drop of the brake pressure can be detected ($p_{HBZ} < p_{HOCH}$).

Now, the brake pressure $p_{HBZ}$ is adjusted to a low value $p_{TIEF}$ (e.g. 2 bar), and analog to the operating point $p_{HOCH}$, the currents $I_{AUFBAU,TIEF}$ and $I_{ABBAU,TIEF}$ are determined which are to be adjusted in order that the control valve arrangement in the operating point $p_{TIEF}$ assumes the "build-up position" or the "relief position", respectively.

With these current values $I_{AUFBAU,HOCH}$, $I_{ABBAU,HOCH}$, $I_{AUFBAU,TIEF}$ and $I_{ABBAU,TIEF}$ determined in this manner, the parameters $m_{ABBAU}$, $b_{ABBAU}$, $m_{AUFBAU}$, and $b_{AUFBAU}$ determining the straight line equations (G1, G2) are calculated for the case of the straight line equation (G1) which is decisive for the "relief position" as:

$$m_{ABBAU} = (I_{ABBAU,TIEF} - I_{ABBAU,HOCH})/(p_{TIEF} - p_{HOCH})$$

$$b_{ABBAU} = I_{ABBAU,HOCH} - (I_{ABBAU,TIEF} - I_{ABBAU,HOCH}) * p_{HOCH}/(p_{TIEF} - p_{HOCH});$$

and in the case of the straight line equation (G2) which is decisive for the "build-up position" as:

$$m_{AUFBAU} = (I_{AUFBAU,TIEF} - I_{AUFBAU,HOCH})/(p_{TIEF} - p_{HOCH})$$

$$b_{AUFBAU} = I_{AUFBAU,HOCH} - (I_{AUFBAU,TIEF} - I_{AUFBAU,HOCH}) * p_{HOCH}/(p_{TIEF} - p_{HOCH}).$$

Figure 5:
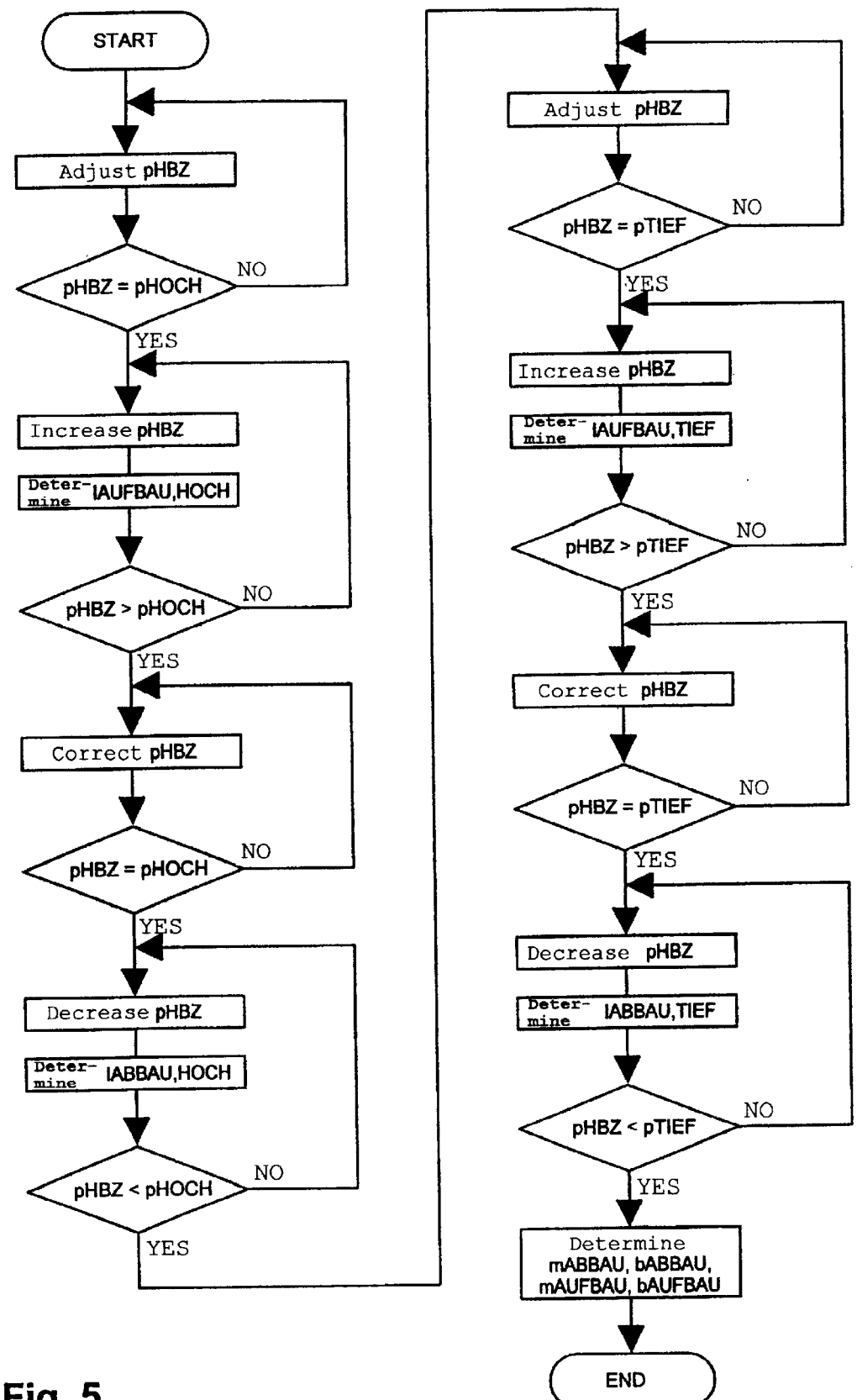
FIG. 5 schematically shows a flow diagram for determining the parameters for the correction of the control characteristic of the control valve arrangement of the electronically controlled brake booster according to FIG. 1

The above explained sequence for determining the currents $I_{ABBAU,TIEF}$, $I_{ABBAU,HOCH}$, $I_{AUFBAU, TIEF}$, and $I_{AUFBAU, HOCH}$ for determining the parameters $m_{ABBAU}$, $b_{ABBAU}$, $m_{AUFBAU}$, and $b_{AUFBAU}$ is represented in the flow diagram shown in FIG. 5 so that virtually no further explanation is necessary.

It is understood that in lieu of adjusting the brake pressure $p_{HBZ}$ via $p_{HOCH}$ or $p_{TIEF}$, respectively, a corresponding adjustment via the pressure difference $delta_p$ could be effected. However, the adjustment via the brake pressure $p_{HBZ}$ offers the great advantage that also tolerances of the effective working areas $A_{BKV}$ and $A_{HBZ}$, which for example, can be production-dependent are taken into account and thus compensated.

Due to the fact that the size of the effective working areas $A_{BKV}$ and $A_{HBZ}$ is designed differently, dependent upon the respective vehicle brake system, the adjustment via the brake pressure $p_{HBZ}$ additionally offers the great advantage that this difference, too, is taken into account and compensated, which makes the inventive method unvariably applicable for differently designed vehicle brake systems. Viewed under practical aspects, the inventive method will be implemented on the process computer of the electronic control unit (not shown herein) so that a standardisation will result in the area of the electronic control unit, which reduces cost and efforts.

The execution of the inventive method for the parameterisation of the correction straight lines (G1, G2) can be performed at each commencement of a trip upon switching on the ignition or, at periodic time intervals, during driving. However, it is particularly reasonable to execute the method during the so-called "end-of-line test", i.e. when the vehicle brake system is subjected to a final function check, so that faults in the electronically controlled brake booster can be detected prematurely. For example, conclusions can be made to a fault if in the sequence according to FIG. 5, the brake pressure $p_{HBZ}$ cannot be adjusted or corrected, respectively, within a pre-determined time interval. In the case, however, that no fault is detected, a parameterisation of the correction straight lines (G1, G2) will already be provided prior to the initial commissioning by the end user (driver).

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An electronically controllable brake booster, with:
    a vacuum chamber and a pressure chamber, which are separated from each other by a movable wall,
    a control valve arrangement being capable of adjusting a pressure difference between the pressure chamber and the vacuum chamber,
    an electromagnetic actuation unit for actuating the control valve arrangement, and
    a controlling unit for controlling a current flowing through the electromagnetic actuation unit wherein the control valve arrangement is adapted to, as a function of the current flowing through the electromagnetic actuation unit, assume a holding position in which the current ranges between a higher value and a lower value without the control valve arrangement leaving the holding position, a first pressure changing position in which the current is higher than the higher value, and second pressure changing position in which the current is lower than the lower value, characterised in that
    the controlling unit is adapted to
        sense a value in the pressure chamber at two different pressure levels, the sensed value being characteristic for a pressure difference between the vacuum chamber and the pressure chamber,
        modify, with the control valve arrangement in each case being in the holding position, and starting from the holding position, the current through the electromagnetic actuation unit in each case in such a manner that the control valve arrangement obtains the first pressure changing position and the second pressure changing position, and
        evaluate current values
            for a changeover from the holding position into the first pressure changing position at a high pressure level,
            for the changeover from the holding position into the first pressure changing position at a low pressure level, and/or
            for a changeover from the holding position into the second pressure changing position at a high pressure level, and
            for the changeover from the holding position into the second pressure changing position at a low pressure level
        for determining a characteristic for the operation of the brake booster, according to which the higher and lower current values of the holding position of the control valve arrangement at different pressure levels are adjusted.

2. The electronically controllable brake booster according to claim 1, characterised in that
    the controlling unit is adapted to determine the current for the higher and lower current values for the holding position of the control valve arrangement at more than two pressure levels.

3. The electronically controllable brake booster according to claim 1, characterised by
    the movable wall being arranged to be axially displaced as an effect by the pressure difference between the pressure chamber and the vacuum chamber, in which a housing of the control valve arrangement is driven.

4. The electronically controllable brake booster according to claim 3, characterised in that
    the electromagnetic actuation unit comprises a solenoid and an armature is arranged in the housing, wherein the armature being movable relative to the housing in an axial direction under the assistance of a first spring arrangement.

5. The electronically controllable brake booster according to claim 3, characterised in that
    a valve arrangement is formed internally of the housing, which connects or separates the vacuum chamber and the pressure chamber, with a valve body of the valve arrangement being biased by a second spring arrangement towards a valve seat or a valve element, respectively, of the valve arrangement.

6. The electronically controllable brake booster according to claim 1, characterised in that
    the controlling unit is adapted to evaluate a hydraulic or pneumatic pressure generated in a master cylinder downstream of the brake booster as the sensed value for the pressure difference.

7. The electronically controllable brake booster according to claim 1, characterised in that
    the first pressure changing position is a pressure build-up position, and
    the second pressure changing position is a pressure relief position.

8. A controlling unit for controlling a current flowing through an electromagnetic actuation unit of an electronically controllable brake booster wherein a vacuum chamber and a pressure chamber are separated from each other by a movable wall and a control valve arrangement actuatable by the electromagnetic actuation unit is capable of adjusting a pressure difference between the pressure chamber and the vacuum chamber, the control valve arrangement being adapted to, as a function of the current flowing through the electromagnetic actuation unit, assume a holding position in with the current ranges between a higher value and a lower value without a leaving the holding position, a first pressure changing position in which the current is higher than the higher value, and a second pressure changing position in which the current is lower than the lower value, the controlling unit being adapted to:
    sense a value in the pressure chamber at two different pressure levels, the sensed value being characteristic for a pressure difference between the vacuum chamber in the pressure chamber,
    modify, with the control valve arrangement in each case being in the holding position, and starting from the holding position, the current through the electromagnetic actuation unit in each case in such a manner that the control valve arrangement obtains the first pressure changing position and the second pressure changing position, and
    evaluate current values
        for a changeover from the holding position into the first pressure changing position at a high pressure level,
        for the changeover from the holding position into the first pressure changing position at a low pressure level, and/or
        for a changeover from the holding position into the second pressure changing position at a high pressure level, and
        for the changeover from the holding position into the second pressure changing position at a low pressure level, for determining a characteristic for the operation of the brake booster, according to which the higher and lower current values of the holding position of the current valve arrangement at different pressure levels are adjusted.

9. The controlling unit according to claim 8, being adapted to
determine the higher and lower current values for the holding position of the current valve arrangement at more than two pressure levels.

10. The controlling unit according to claim 8, characterised in that,
the first pressure changing position is a pressure build-up position, and
the second pressure changing position is a pressure relief position.

11. A method for controlling a current flowing through an electromagnetic actuation unit of an electronically controllable brake booster wherein a vacuum chamber and a pressure chamber are separated from each other by a movable wall and a control valve arrangement actuatable by the electromagnetic actuation unit is capable to adjust a pressure difference between the pressure chamber and the vacuum chamber, the control valve arrangement being adapted to, as a function of the current flowing through the electromagnetic actuation unit, assume a holding position, a first pressure changing position and a second pressure changing position, the method comprising the steps of:
defining a higher current value and a lower current value for the current flowing through the electromagnetic actuation means such that the control valve arrangement assume the holding position for the current ranging between the higher current value and the lower current value without leaving the holding position, assumes the first pressure changing position for the current being higher than the higher current value, and assumes the second pressure changing position for the current being lower than the lower current value, characterised by sensing a value in the pressure chamber at two different pressure levels, the sensed value being characteristic for a pressure difference between the vacuum chamber and the pressure chamber, modifying, with the control valve arrangement in each case being in the holding position, and starting from the holding position, the current through the electromagnetic actuation unit in each case in such a manner that the control valve arrangement obtains the first pressure changing position and the second pressure changing position, and evaluating current values
for a changeover from the holding position into the first pressure changing position at a high pressure level,
for the changeover from the holding position into the first pressure changing position at a low pressure level, and/or
for a changeover from the holding position into the second pressure changing position at a high pressure level, and
for the changeover from the holding position into the second pressure changing position at a low pressure level, determining, on the basis of the evaluating of the current values, a characteristic for the operation of the brake booster, and adjusting, according to the determined characteristic, the higher and lower current values for the holding position of the control valve arrangement at different pressure levels.

12. The method according to claim 11, comprising:
determining the higher and lower current values for the holding position of the control valve arrangement at more than two pressure levels.

* * * * *